（12）United States Patent
Fritzley et al.

(10) Patent No.: US 8,171,036 B2
(45) Date of Patent: May 1, 2012

(54) METHOD AND APPARATUS FOR PROCESSING DATA RECORDS IN A GIVEN ORDER UPON RECEIVING INPUT DATA FROM A TOUCHSCREEN

(75) Inventors: Eric Allan Fritzley, Waterloo (CA); Adrian Michael Logan, Waterloo, CA (US); Rohit Rocky Jain, Waterloo, CA (US)

(73) Assignee: Research In Motiion Limited, Waterloo, ON ( * ) Notice: Subject to any disclaimer, the term of this patent is extended or adjusted under 35 U.S.C. 154(b) by 343 days.

(21) Appl. No.: 12/506,309

(22) Filed: Jul. 21, 2009

(65) Prior Publication Data
US 2011/0022607 A1    Jan. 27, 2011

(51) Int. Cl.
*G06F 7/00* (2006.01)
(52) U.S. Cl. .................................. 707/752; 715/702
(58) Field of Classification Search ............. 707/752; 715/702
See application file for complete search history.

(56) References Cited

U.S. PATENT DOCUMENTS

| 7,340,691 | B2 * | 3/2008 | Bassett et al. | 715/255 |
| 7,744,468 | B2 * | 6/2010 | Boyd et al. | 463/42 |
| 2009/0174680 | A1 * | 7/2009 | Anzures et al. | 345/173 |

* cited by examiner

*Primary Examiner* — Etienne Leroux
*Assistant Examiner* — Cindy Nguyen
(74) *Attorney, Agent, or Firm* — Perry + Currier

(57) ABSTRACT

A method and computing device for managing calendar data records are provided, the computing device comprising a processor interconnected with a memory enabled to maintain the data records and with a touchscreen controlled to generate a representation of a subset of at least two of the data records within a first portion of the touchscreen. The touchscreen is further controlled to generate a representation of details of a first one of the data records in the subset in a second portion of the touchscreen, different from the first portion, when input data associated with the first portion is detected by the touchscreen. The touchscreen is further controlled to generate a representation of details of a next data record in the subset, in a given order, in the second portion, each time an input event is detected at a portion of the touchscreen associated with providing next data records.

21 Claims, 11 Drawing Sheets

METHOD AND APPARATUS FOR PROCESSING DATA RECORDS IN A GIVEN ORDER UPON RECEIVING INPUT DATA FROM A TOUCHSCREEN

FIELD

The specification relates generally to touchscreens, and specifically to a method and apparatus for processing data records in a given order upon receiving input data from a touchscreen.

BACKGROUND

Mobile electronic devices are increasingly being equipped with touchscreen enabled display devices, which acts as the primary human-machine interface. While touchscreens can provide a rich interactive experience, display devices on mobile electronic devices generally have a small area, which can cause issues when small representations of data on the display device are to be selected via the touchscreen. For example, when a representation of multiple conflicting calendar appointments are provided on the display device in week or month views, and in some instances day views, input data representing an input event for a first appointment can be indistinguishable from input data representing an input event for a second appointment. In other words, the representations are too small to be individually selected via a person's finger. While this has been previously addressed through the use of a stylus, such a solution is not always desirable (e.g. a stylus can be lost, and can be generally inconvenient) and neither is a stylus compatible with all touchscreen technologies. The problem can also be addressed by equipping the mobile device with a trackball, trackwheel or other type of selection device, with which the various representations can be selected, however this increases the cost of the mobile device and further makes manufacturing more complex.

BRIEF DESCRIPTIONS OF THE DRAWINGS

Embodiments are described with reference to the following figures, in which.

DETAILED DESCRIPTION OF THE EMBODIMENTS

Figure 1:
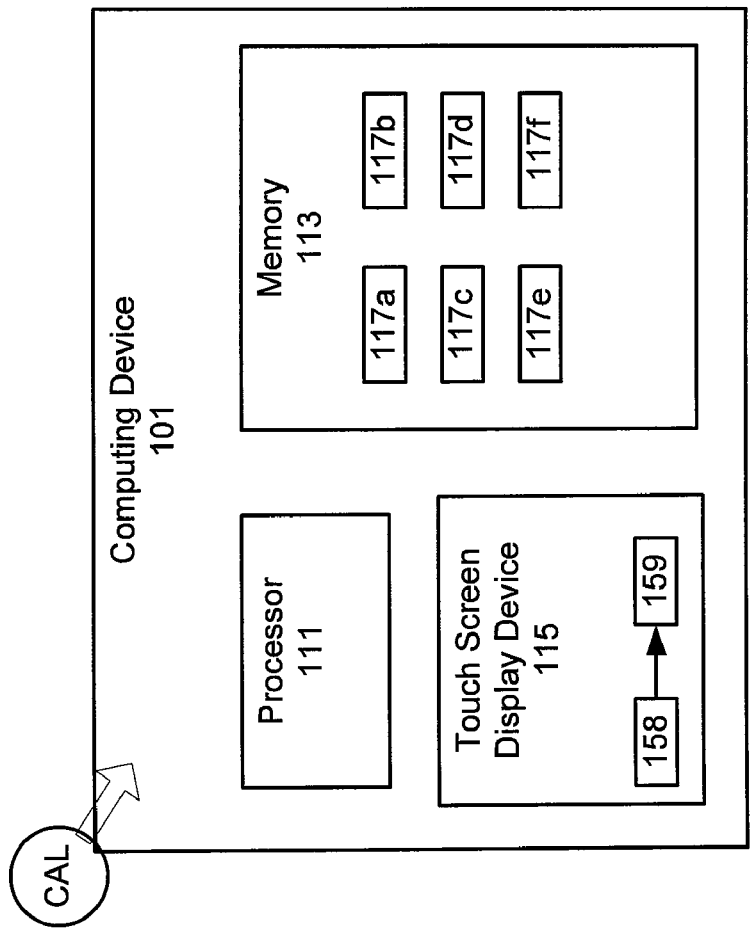
FIG. 1 depicts a block diagram of a mobile computing device for processing data records in a given order upon receiving input data from a touchscreen, according to non-limiting embodiments.

A first aspect of the specification provides a method for managing data records at a computing device, each of the data records representing different calendar data. The computing device comprises a processor interconnected with a memory enabled to maintain the data records, and a touchscreen display device enabled to detect input data. The method comprises generating a representation of a subset of the data records within a first portion of the touchscreen display device, the first portion associated with the subset, the subset comprising at least two of the data records. The method further comprises generating a representation of details of a first one of the data records in the subset in a second portion of the touchscreen display device, different from the first portion, when input data associated with the first portion is detected by the touchscreen display device. The method further comprises generating a representation of details of a next data record in the subset, in a given order, in the second portion, each time an input event is detected at a portion of the touchscreen display device associated with providing next data records.

The given order can comprise a cyclic order.

The given order can comprise an order according to at least one of respective start times associated with each data record, respective finish times associated with each data record, and respective priorities associated with each data record.

The portion of the touchscreen display device associated with providing next data records can comprise at least one of the first portion and the second portion.

The portion of the touchscreen display device associated with providing next data records can comprise a third portion of the touchscreen display device. The method can further comprise controlling the touchscreen display device to generate a next data record icon in the third portion when input data associated with the first portion is first detected by the touchscreen display device.

The representation of a subset of the data records can be provided within a representation of a calendar application at the touchscreen display device. The first portion associated with the subset can comprise a representation of a given time period within the calendar application, and a time period associated with each data record in the subset comprises a portion of the given time period. Each data record in the subset can comprise at least one of calendar event data, meeting data, and alarm data.

The touchscreen display device can comprise at least one of a capacitive touchscreen display device, a resistive touchscreen display device, an infrared touchscreen display device, a surface acoustic wave touchscreen display device, an optical imaging touchscreen display device, a dispersive signal touchscreen and an acoustic pulse recognition touchscreen display device.

A second aspect of the specification provides a computing device configured to manage data records, each of the data records representing different calendar data. The computing device comprises a memory enabled to maintain the data records. The computing device further comprises a touchscreen display device enabled to detect input data. The computing device further comprises a processor interconnected with the touchscreen display device and the memory. The processor is enabled to control the touchscreen display device to generate a representation of a subset of the data records within a first portion of the touchscreen display device, the first portion associated with the subset, the subset comprising at least two of the data records. The processor is further enabled to control the touchscreen display device to generate a representation of details of a first one of the data records in the subset in a second portion of the touchscreen display device, different from the first portion, when input data associated with the first portion is detected by the touchscreen display device. The processor is further enabled to control the touchscreen display device to generate a representation of details of a next data record in the subset, in a given order, in the second portion, each time an input event is detected at a portion of the touchscreen display device associated with providing next data records.

The given order can comprise a cyclic order.

The given order can comprise an order according to at least one of respective start times associated with each data record, respective finish times associated with each data record, and respective priorities associated with each data record.

The portion of the touchscreen display device associated with providing next data records can comprise at least one of the first portion and the second portion.

The portion of the touchscreen display device associated with providing next data records can comprise a third portion of the touchscreen display device. The processor can be further enabled to control the touchscreen display device to generate a next data record icon in the third portion when input data associated with the first portion is first detected by the touchscreen display device The representation of a subset of the data records can be provided within a representation of a calendar application at the touchscreen display device. The first portion associated with the subset can comprise a representation of a given time period within the calendar application, and a time period associated with each data record in the subset can comprise a portion of the given time period. Each data record in the subset can comprise at least one of calendar event data, meeting data, and alarm data.

The touchscreen display device can comprise at least one of a capacitive touchscreen, a resistive touchscreen, an infrared touchscreen, a surface acoustic wave touchscreen, an optical imaging touchscreen, a dispersive signal touchscreen and an acoustic pulse recognition touchscreen.

A third aspect of the specification provides for a computer-readable medium for storing program instructions for controlling a computing device configured to manage data records, each of the data records representing different calendar data, the program instructions for causing the computing device to: generate a representation of a subset of the data records within a first portion of a touchscreen display device, the first portion associated with the subset, the subset comprising at least two of the data records; generate a representation of details of a first one of the data records in the subset in a second portion of the touchscreen display device, different from the first portion, when input data associated with the first portion is detected by the touchscreen display device; and generate a representation of details of a next data record in the subset, in a given order, in the second portion, each time an input event is detected at a portion of the touchscreen display device associated with providing next data records.

FIG. 1 depicts a mobile computing device 101 for processing data records in a given order upon receiving input data from a touchscreen enabled display device 115. Mobile computing device 101 generally comprises a processor 111, a memory 113 and touchscreen enabled display device 115, processor 111 interconnected with memory 113 and touchscreen enabled display device 115, for example via a computer bus (not depicted).

In exemplary embodiments depicted in FIG. 1, the mobile computing device 101 can further comprise a calendaring application CAL, which can be stored in the memory 113 and processed by the processor 111. Upon processing the calendaring application CAL, the mobile computing device 101 is enabled to provide calendar functionality.

In some embodiments, the mobile computing device 101 comprises at least one of a PDA, a portable communications device, a portable computing device, a mobile telephone and the like. In these embodiments, the mobile computing device 101 can be further enabled to process e-mail, text messages, mobile telephone calls, browser applications and the like.

Memory 113 can comprise any suitable memory including but not limited to volatile memory, non-volatile memory, read-only memory (ROM), random access memory (RAM), flash memory, removable memory, a hard disk, and the like. In some embodiments, memory 113 comprises a computer-readable medium for storing program instructions for controlling a computing device configured to manage data records, such as mobile computing device 101. Each of the data records are understood to represent different calendar data. Furthermore, the program instructions are generally for causing the computing device to: generate a representation of a subset of the data records within a first portion of a touchscreen display device, the first portion associated with the subset, the subset comprising at least two of the data records; generate a representation of details of a first one of the data records in the subset in a second portion of the touchscreen display device, different from the first portion, when input data associated with the first portion is detected by the touchscreen display device; and generate a representation of details of a next data record in the subset, in a given order, in the second portion, each time an input event is detected at a portion of the touchscreen display device associated with providing next data records.

In particular, memory 113 is enabled to store data records 117a, 117b ... 117f (collectively data records 117 and generically a data record 117), each data record 117 representing different calendar data, as will be described below. While six data records 117 are shown exemplary embodiments depicted in FIG. 1, it is understood that the number of data records 117 is not to be considered particularly limiting and memory 113 can store any suitable number of data records 117.

In non-limiting exemplary embodiments, data records 117 can be arranged within a Table, such as Table 1:

TABLE 1

| Data Record | Date | Time | Type | Description |
|---|---|---|---|---|
| 117a | Thurs. Mar. 12, 2009 | 12:45 p-1:15 p | Meeting | Meet Bob |
| 117b | Thurs. Mar. 12, 2009 | 1:00 p-2:00 p | Meeting | Finance Committee |
| 117c | Thurs. Mar. 12, 2009 | 1:00 p | Alarm | Take Pills |
| 117d | Thurs. Mar. 12, 2009 | 1:15 p-1:45 p | Meeting | Meet with CEO |
| 117e | Thurs. Mar. 12, 2009 | 1:30 p-2:00 p | Meeting | Sales Meeting |
| 117f | Thurs. Mar. 12, 2009 | 1:45 p-2:45 p | Meeting | Conference Call |

While Table 1 is arranged in rows and columns, the format of Table 1 is not to be considered particularly limiting. Furthermore, it is understood that Table 1 is provided only to conveniently show respective contents of each data record in non-limiting exemplary embodiments, and further that data records 117 can be arranged and stored in any suitable format, and need not be in table form. Each data record 117 comprises a date and time on which a calendar event is to occur (e.g. data record 117a comprises data representative of a calendar event occurring on Thurs. Mar. 12, 2009 from 12:45 p-1:15 p). Each data record 117 can further comprise a description of a type of each data record 117 (e.g. meetings or alarms, or any other suitable type), and a description of the calendar event (e.g. data record 117a comprises the text "Meet Bob"). It is understood that data records 117 represent calendar events within the time period 1:00 p-2:00 p on Thursday, Mar. 12, 2009 and further more that some of the calendar events associated with data records 117 overlap and/or conflict within the time period 1:00 p-2:00 p on Thursday, Mar. 12, 2009.

Figure 2:
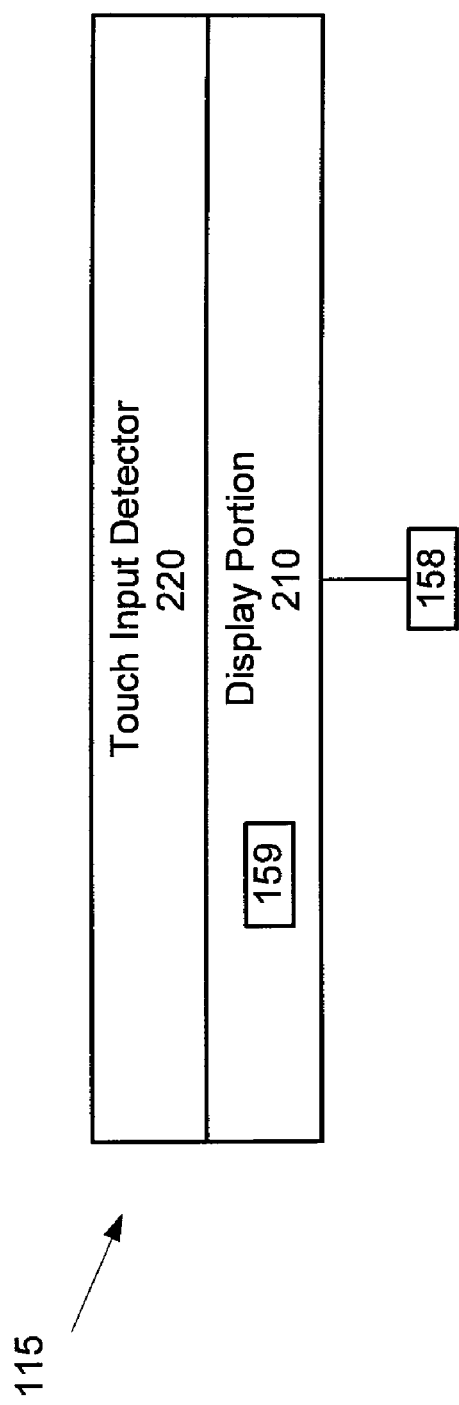
FIG. 2 depicts a block diagram of a touchscreen enabled display device of the mobile computing device of FIG. 1/ according to non-limiting embodiments.

Turning now to FIG. 2, which depicts a block diagram of touchscreen enabled display device 115, touchscreen enabled display device 115 comprises a display portion 210 and a touch input detector 220. Touchscreen enabled display device 115 further comprises circuitry 158 for generating a representation 159 of data at display portion 210. Display portion 210 can include, but is not limited to, any suitable combination of CRT and/or flat panel displays (e.g. LCD, plasma and the like), and circuitry 158 can include any suitable combination of circuitry for controlling a CRT and/or flat panel displays etc., including but not limited to display buffers, transistors, electron beam controllers, LCD cells, plasmas cells, phosphors etc. In particular, display portion 210 and circuitry 158 can be controlled by processor 111 to generate representation 159.

Touch input detector 220 comprises any suitable touchscreen technology including, but not limited to: a capacitive touchscreen, a resistive touchscreen, an infrared touchscreen, a surface acoustic wave touchscreen, an optical imaging touchscreen, a dispersive signal touchscreen and an acoustic pulse recognition touchscreen. In some embodiments, touch input detector 220 is overlaid onto display portion 210 (e.g. as in a capacitive or resistive touchscreen), while in other embodiments, touch input detector 220 can comprise sensors at the edges and/or corners of display portion 210 (e.g. as in an infrared or optical touchscreen). In any event, touch input detector 220 has substantially the same area as display portion 210 and is substantially transparent such that display portion 210 is viewable there through. Furthermore, touch input detector 220 is connected to processor 111 such that input data from touch input detector 220 can be processed. For example, input data from touch input detector 220 generally comprises input events resulting from touch input detector 220 detecting a touch to at least one of display portion 210 and touch input detector 220, dependent on the technology used in touch input detector 220. Processor 111 is enabled to associate different portions of touchscreen enabled display device 115 to respective input data detected by touch input detector 220 such that the portion of the touchscreen enabled display device 115 that has been touched can be determined.

Furthermore, while in FIG. 2, touch input detector 220 is depicted as having substantially the same surface area of display portion 210, and further as being in contact with display portion 210, in other embodiments, touch input detector 220 can have a surface area different from display portion 210, and further need not be in contact with display portion 210. Indeed, it is understood that touch input detector 220 can be at a distance from display portion 210 (e.g. a camera) and/or can be located at or near the edges of display portion 210.

Figure 3:
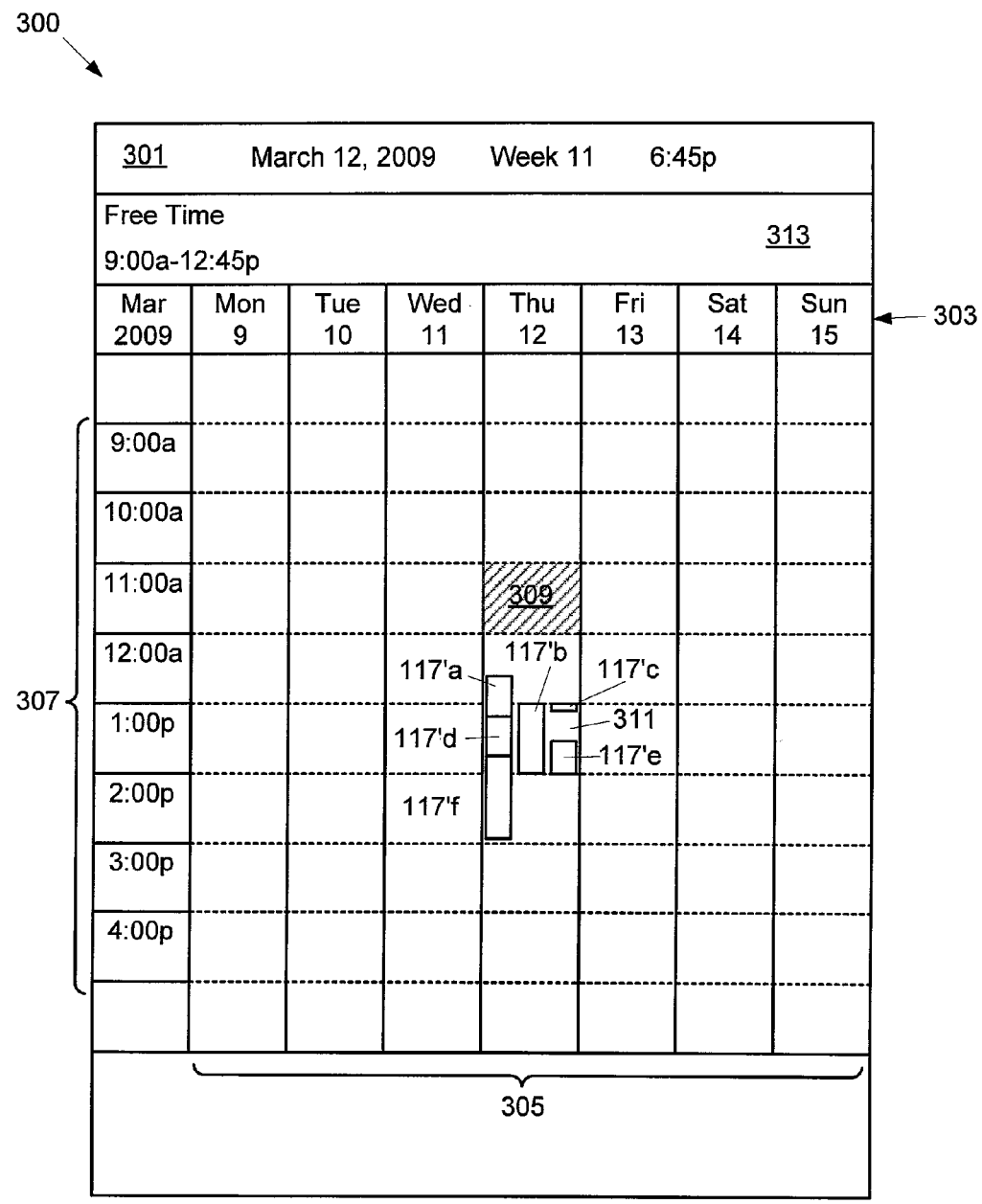
FIGS. 3 through 10 depict representations of a calendar application provided at the touch screen enabled display device of FIG. 2, according to non-limiting embodiments.

Attention is now directed to FIG. 3 which depicts a representation 300 of calendar application CAL provided at touchscreen enabled display device 115, in non-limiting embodiments. In some embodiments, representation 159 comprises representation 300. Furthermore, it is understood that representation 300 is divided into different portions, described hereafter, and that each portion is associated with different portion of touchscreen enabled display device 115; it is furthermore understood that touchscreen device 220 is enabled to detect when a given portion of touchscreen enabled display device 115 has been selected via receipt of input data and that processor 111 can then determine which portion of touchscreen enabled display device 115 (and correspondingly which portion of representation 300) has been selected. Furthermore, it is understood that processor 111 can then control touchscreen enabled display device 115 to update representation 300 dependent on which portion of touchscreen enabled display device 115 has been selected. In general, representation 300 comprises calendar application CAL in a "week" view, however in other embodiments, calendar application CAL can be represented in any suitable view, including but not limited to a "day" view and a "month" view.

Representation 300 comprises a header portion 301 which, in depicted embodiments, comprises a current date and time, and week of the year (e.g. "Mar. 12, 2009 Week 11 6:45 p"), though the presence and contents of header portion 301 is not to be considered particularly limiting. Representation 300 further comprises a row 303 comprising data indicative of dates in a calendar (e.g. Monday Mar. 9, 2009 through Sunday Mar. 15, 2009), each date in row 303 comprising a header of respective columns 305, each column 305 comprising data indicative of events in a respective given day in a calendar. Representation 300 further comprises a plurality of rows 307, each row 307 comprising a different time period for the days represented in columns 305. In general, the intersections of columns 305 and rows 307 divide representation 300 into a plurality of portions, for example portions 309 and 311, each of which are representative of a given time period on a given day. For example, portion 309 is representative of 11:00 a-12:00 p on Thursday Mar. 12, 2009; and portion 311 is representative of 1:00 p-2:00 p on Thursday Mar. 12, 2009.

Representation 300 further comprises a representation of at least a subset of data records 117. For example each of data records 117 are respectively represented by representations 117' (i.e. in this embodiment, the subset of data records 117 comprises all data records 117, though it is understood that memory 113 can comprise more data records than data records 117). For example data record 117a, as understood from Table 1, comprises data indicative of a calendar event occurring on Thursday, Mar. 12, 2009 from 12:45 p-1:15 p; hence representation 117'a comprises a block extending from 12:45 p-1:15 p on Thursday, Mar. 12, 2009. Data record 117c comprises data indicative of an alarm occurring at 1:00 p on Thursday, Mar. 12, 2009; hence representation 117'c comprises a block at 1:00 p on Thursday, Mar. 12, 2009. It is understood that each representation 117' extends, at least in part, through portion 311 and that some of the calendar events associated with data records 117 overlap and/or conflict within the time period represented by portion 311.

In general, it is understood that processor 111 has controlled touchscreen enabled display device 115 to generate a representation of a subset of data records 117 within portion 311, portion 311 associated with the subset, the subset comprising at least two of data records 117; in these embodiments, however, the subset comprises six of the data records 117. Furthermore it is understood that the representation of the subset of data records 117 comprises representations 117'.

It is further understood, from FIG. 3, that portion 309 has been selected as portion 309 has been controlled by processor 311 to be visually distinguishable from other portions: in depicted embodiments, portion 309 is shaded, however portion 309 can be controlled in any suitable manner to visually distinguish it from other portions (e.g. a different colour, different font, and the like). In any event it is understood that touch input detector 220 has detected that input data has been received at an area corresponding to portion 309, and that processor 111 has received the input data and has controlled display device (e.g. circuitry 158) to cause portion 309, within representation 300, to be shaded. In other words, an input event has been detected at portion 309 (e.g. a portion of touchscreen enabled display device 115 corresponding to portion 309 has been touched) and portion 309 has been controlled to indicate that it has been selected. In general, selected portions can be suitably controlled to be visually distinguishable from unselected portions.

Representation 300 further comprises a portion 313 for providing details of a selected portion. For example, in FIG. 3, portion 309 has been selected, however there are no data records 117 associated with portion 309. Hence, portion 313 comprises the text "Free Time" and further comprises an indication of how long the "Free Time" extends (i.e. from 9:00 a-12:45 p). It is assumed, in these embodiments, that 9:00 a represents the beginning of a work day, however this time can be configurable to correspond to any desired time.

Figure 4:
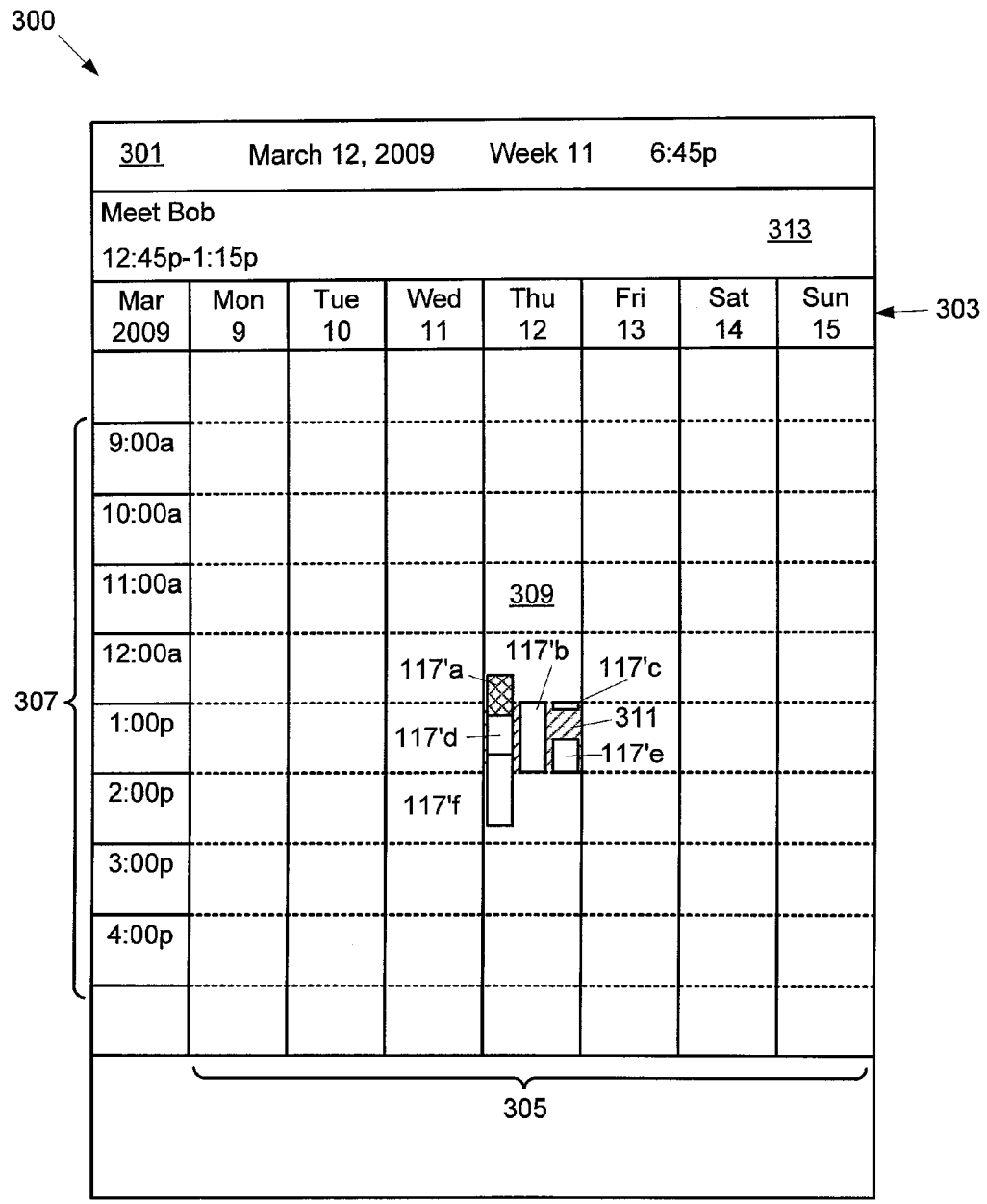

Attention is now directed to FIG. 4, which is similar to FIG. 3, with like elements having like numbers, however in FIG. 4, portion 311 has been selected, as indicated by portion 311 being shaded. In these embodiments, portion 313 provides a representation of details of a first one of the subset of data records 117 associated with selected portion 311, and in particular details of data record 117a: "Meet Bob 12:45 p-1:15 p". Details of a given data record 117 can be retrieved from the "Date", "Time", "Type" and/or "Description" columns of Table 1 (and/or corresponding fields in data records 117). Furthermore, representation 117'a is controlled to visually distinguish it from others of representations 117' (e.g. representation 117'a is shaded), indicating that the representation of details in portion 313 is associated with representation 117'a.

In some embodiments, portion 313 can be controlled to provide the representation of the details of data record 117a when portion 311 is first selected. While in the depicted embodiments, details of data record 117a are provided in portion 313, in other embodiments, details of any one of data records 117 can be provided in portion 313 when portion 311 is first selected, according to any suitable algorithm. For example, in some embodiments, a representation of details a data record 117 associated with a calendar event having the earliest start time can be provided first (e.g. data record 117a). In other embodiments, a representation of details a data record 117 associated with a calendar event having the latest end time can be provided first (e.g. data record 117f). In yet further embodiments, a representation of details a data record 117 associated with an alarm can be provided first (e.g. data record 117c). However, the method of determining details of which of data records 117 that is to be provided first in portion 313 is not to be considered particularly limiting.

In any event, processor 111 is further enabled to control touchscreen enabled display device 115 to generate a representation of details, in portion 313, of successive data records 117 associated with portion 311, in a given order, each time receipt of input data is detected at a portion of touchscreen enabled display device 115 corresponding to portion 311. Hence, each time portion 311 is selected, processor 111 will control touchscreen enabled display device 115 to generate a representation of details of a successive data record 117 associated with portion 311. For example, in FIG. 5, substantially similar to FIG. 4, with like elements having like numbers, it is understood that portion 311 has been selected a second time. Hence, portion 313 comprises a representation of details of data record 117b ("Finance Committee 1:00 p-2:00 p") and further representation 117b' is now shaded.

Figure 5:
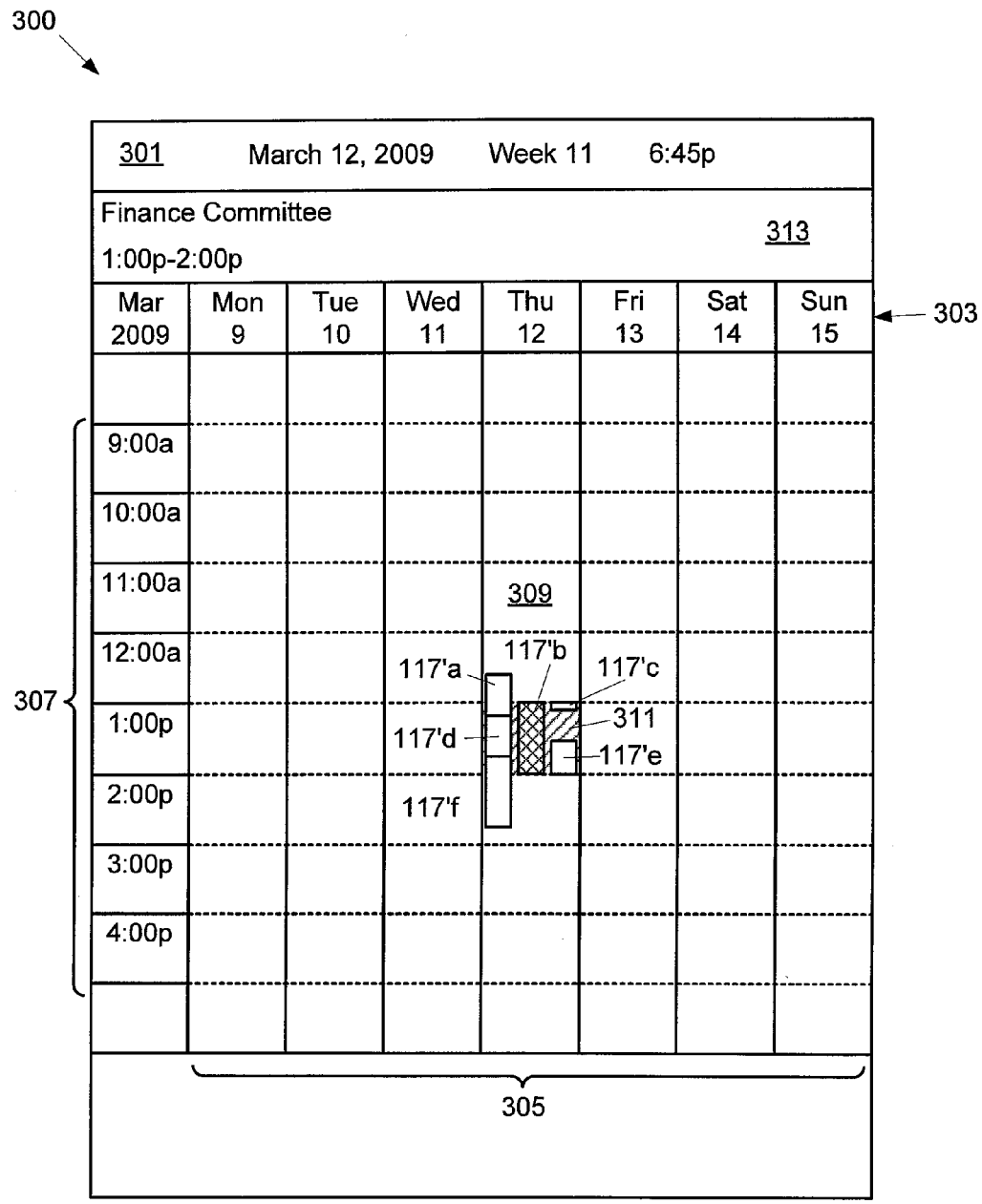
Figure 6:
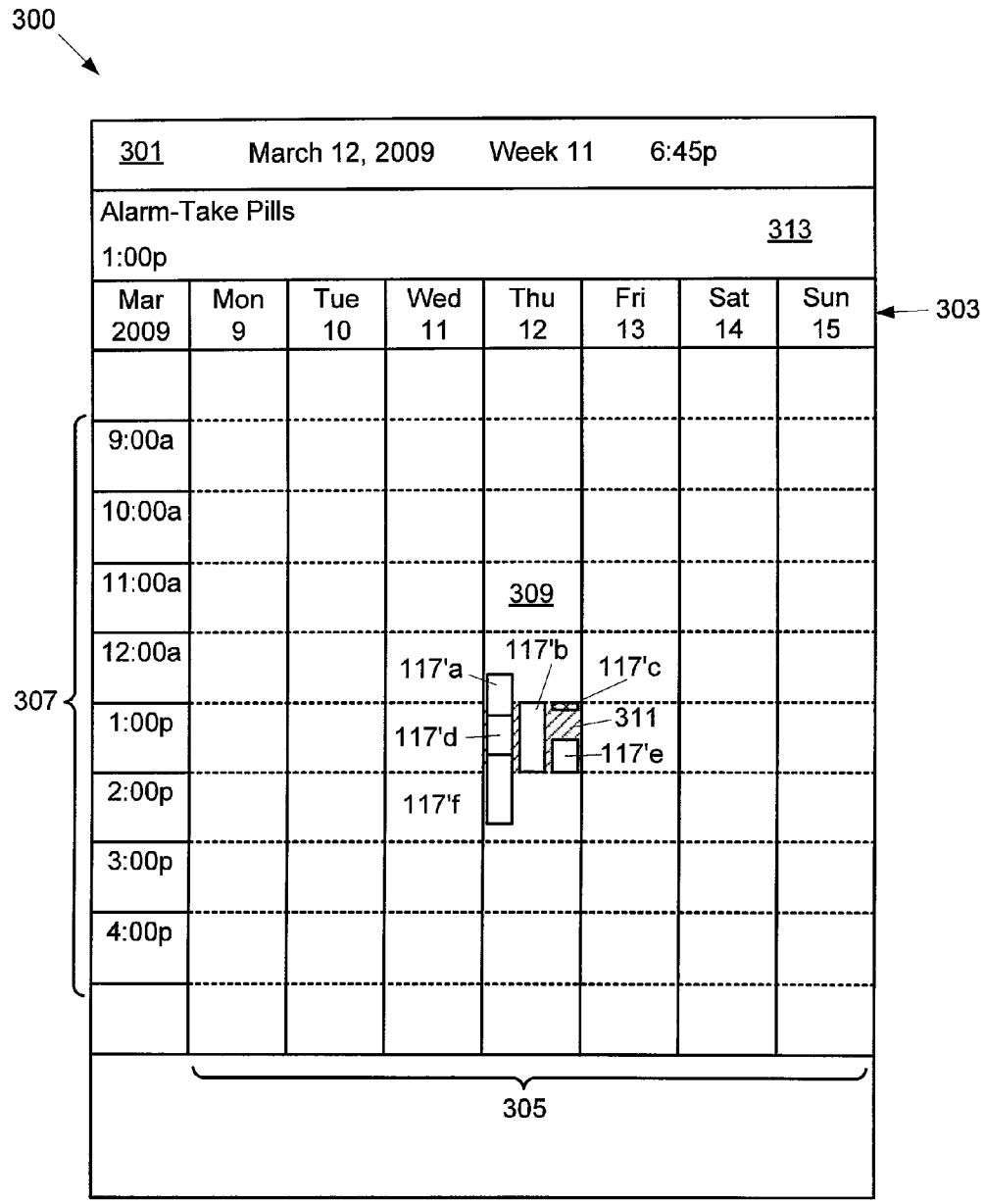

Similarly, in FIG. 6, substantially similar to FIG. 5, with like elements having like numbers, it is understood that portion 311 has been selected a third time. Hence, portion 313 comprises a representation of details of data record 117c ("Alarm-Take Pills 1:00 p") and further representation 117c' is now shaded.

Figure 7:
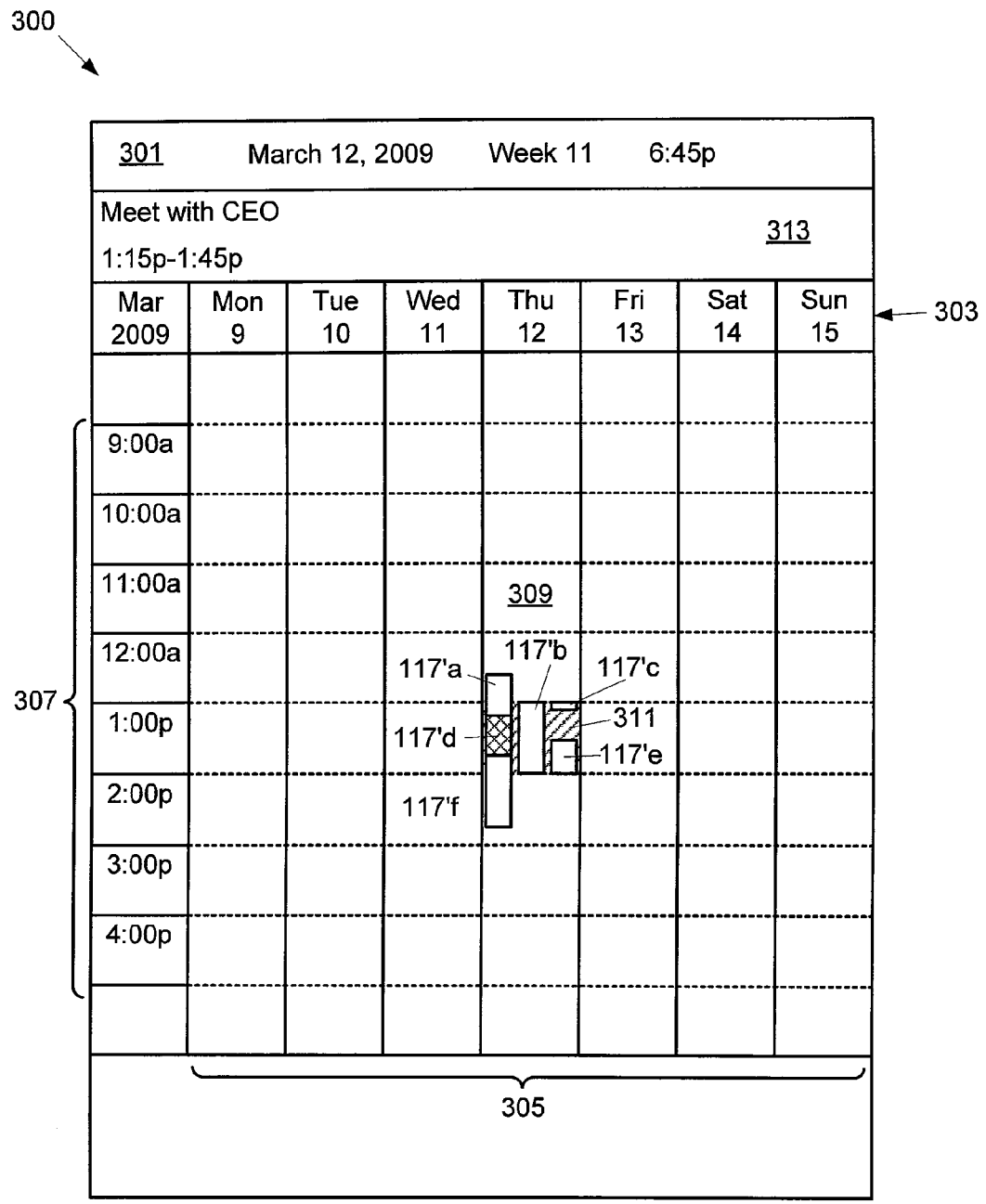

In FIG. 7, substantially similar to FIG. 6, with like elements having like numbers, it is understood that portion 311 has been selected a fourth time. Hence, portion 313 comprises a representation of details of data record 117d ("Meet with CEO 1:15 p-1:45 p") and further representation 117d' is now shaded.

Figure 8:
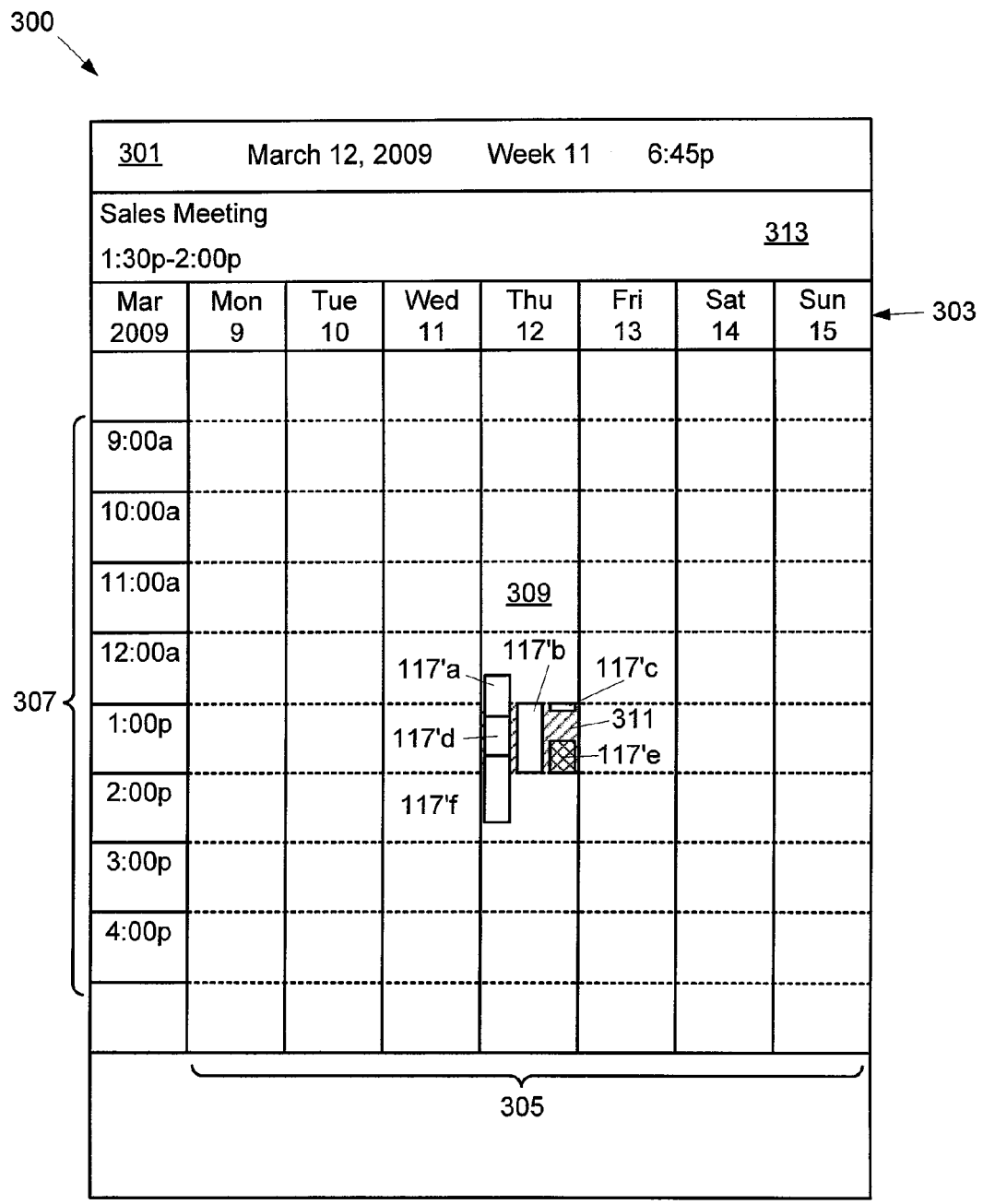

In FIG. 8, substantially similar to FIG. 7, with like elements having like numbers, it is understood that portion 311 has been selected a fifth time. Hence, portion 313 comprises a representation of details of data record 117e ("Sales Meeting 1:30 p-2:00 p") and further representation 117e' is now shaded.

Figure 9:
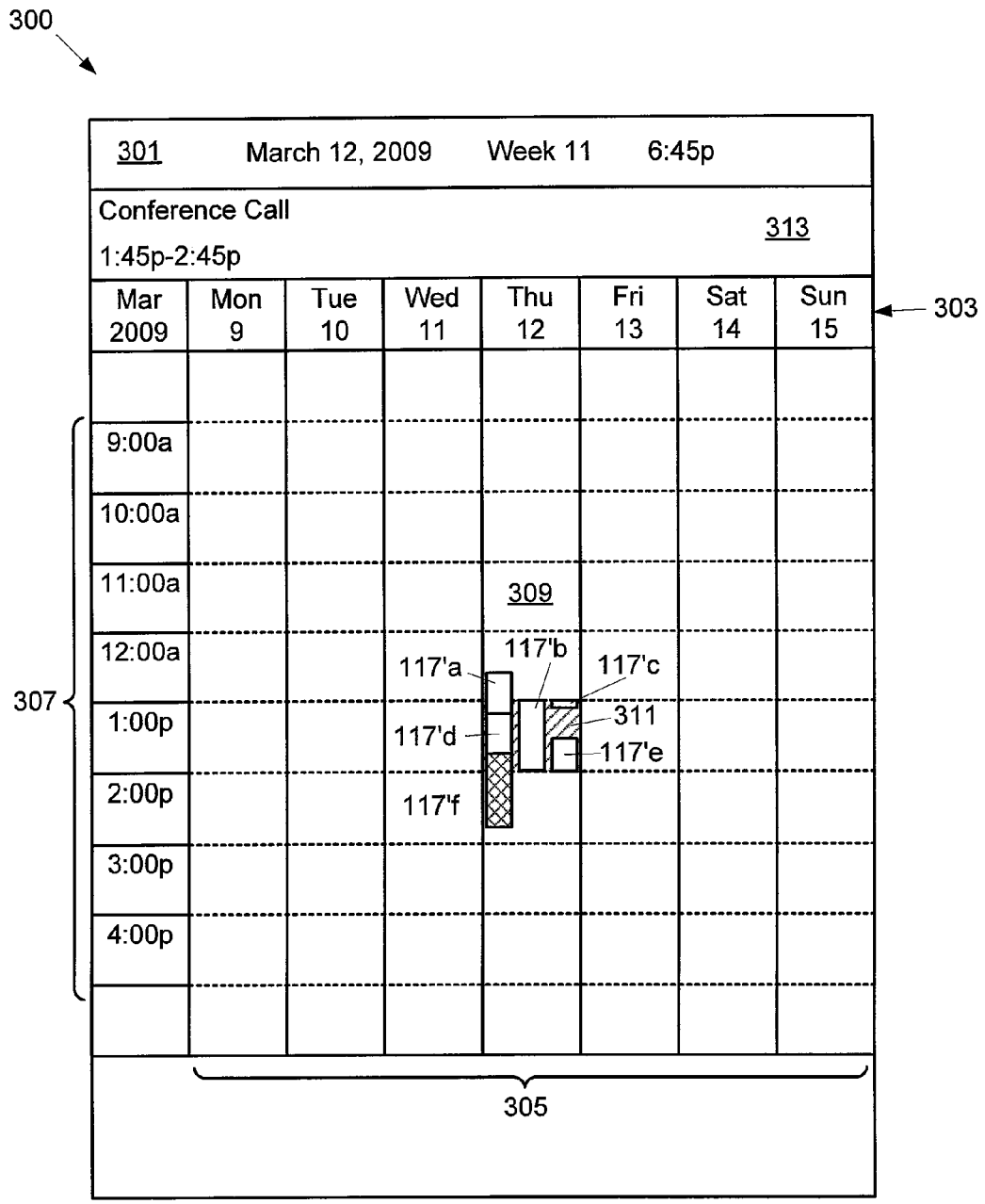

Finally, in FIG. 9, substantially similar to FIG. 8, with like elements having like numbers, it is understood that portion 311 has been selected a sixth time. Hence, portion 313 comprises a representation of details of data record 117f ("Conference Call 1:45 p-2:45 p") and further representation 117f is now shaded. If portion 311 is selected a seventh time, touchscreen enabled display device 115 will be controlled to provide representation 300 as depicted in FIG. 5, and successively provide representation 300 as depicted in FIGS. 6-9 if portion 311 continues to be selected.

In general, the order in which details of data records 117 are provided when portion 311 is successively selected is generally non-limiting and can be configurable at mobile electronic device 101. For example, details of data records 117 can be provided in an order of start time, end time, by type, by a priority (e.g. in embodiments where each data record 117 further comprises data indicative of a priority of a calendar event; e.g. "Meet with CEO" can be given a higher priority than "Meet Bob") or any other suitable order.

Figure 10:
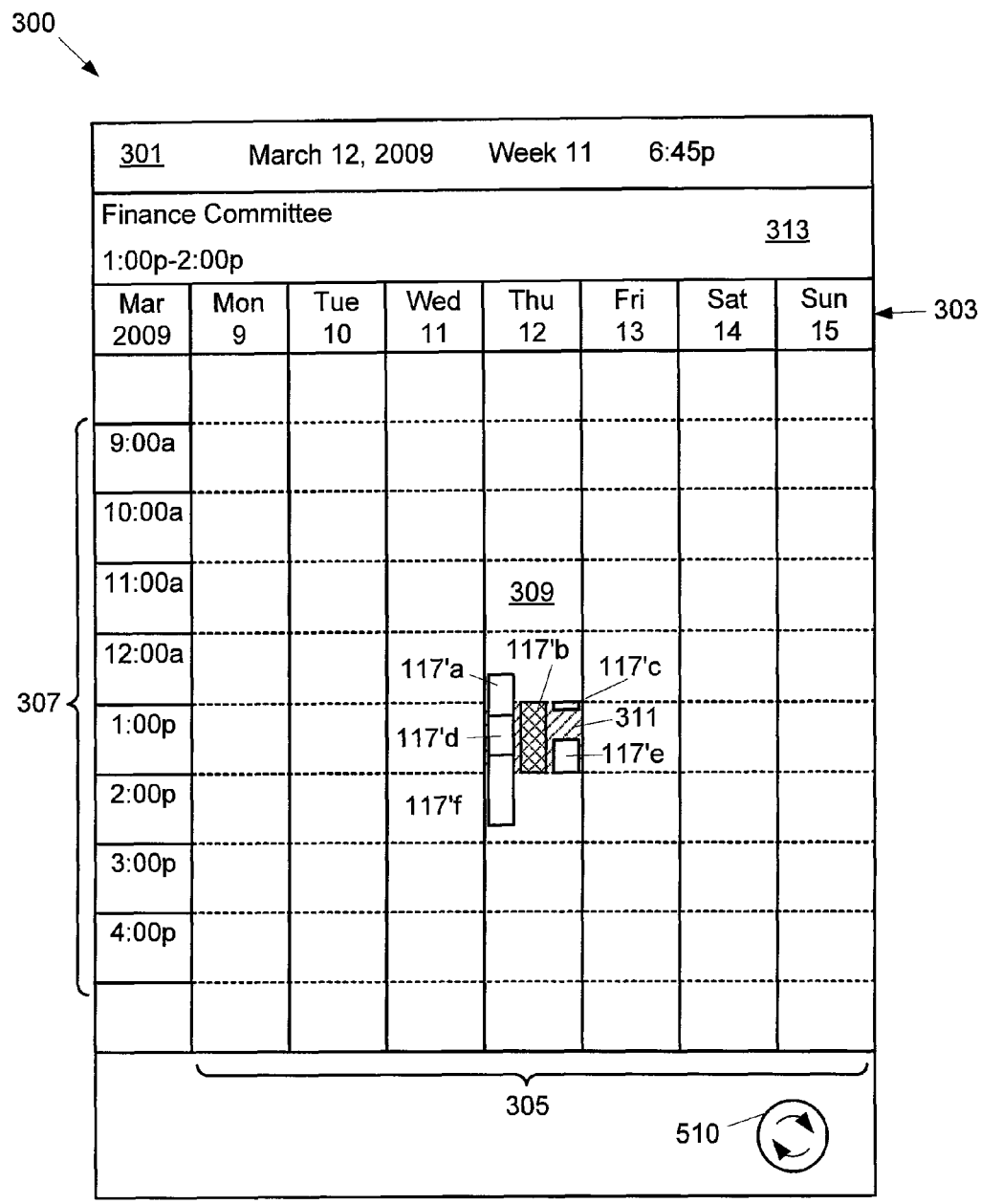

Furthermore, in other embodiments, other portions of touchscreen enabled display device 115 can be successively selected to cause portion 313 to be controlled to successively provide details of data records 117 associated with portion 311. For example, once portion 311 is first selected, portion 313 can be successively selected to cause portion 313 to be controlled to successively provide details of data records 117 associated with portion 311. In yet further embodiments, as depicted in FIG. 10, substantially similar to FIG. 5, with like elements having like numbers, representation 300 can further comprise a representation 510 associated with providing next data records: once portion 311 is first selected (or any other suitable portion), portion 313 to be controlled to successively provide details of data records 117 associated with portion 311 when input data is detected at a portion of touchscreen enabled display device 115 corresponding to representation 510. In some embodiments, representation 510 is provided within representation 300 only when a portion of representation 300 is selected that is associated with a plurality of data records (similar to data records 117). It is understood that representation 510 generally comprises a next data record icon.

Figure 11:
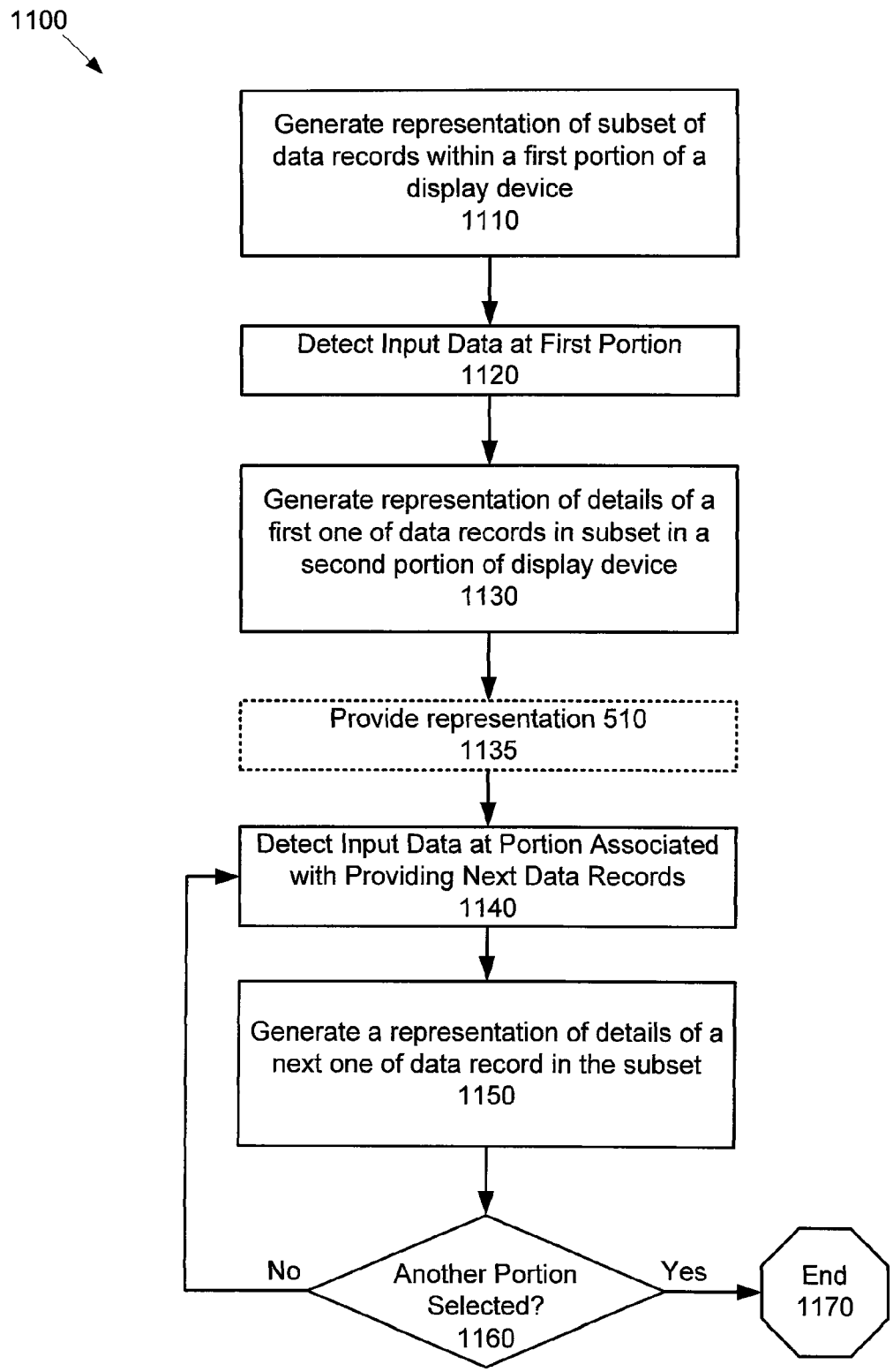
FIG. 11 depicts a method for processing data records in a given order upon receiving input data from a touchscreen, according to non-limiting embodiments.

Attention is now directed to FIG. 11 which depicts a method 1100 for processing data records in a given order upon receiving input data from a touchscreen. In order to assist in the explanation of the method 11010, it will be assumed that the method 1100 is performed using mobile electronic device 101. Furthermore, the following discussion of the method 1100 will lead to a further understanding of mobile electronic device bland its various components. However, it is to be understood that mobile electronic device 101 and/or the method 1100 can be varied, and need not work exactly as discussed herein in conjunction with each other, and that such variations are within the scope of present embodiments.

At step 1110, touchscreen enabled display device 115 is controlled to generate a representation of a subset of data records 117 within a first portion of touchscreen enabled display device 115, such as a portion of touchscreen enabled display device 115 corresponding to portion 311 of representation 300. The first portion is generally associated with the subset, the subset comprising at least two of data records 117. For example, the portion of touchscreen enabled display device 115 corresponding to portion 311 is associated with data records 117 as each of data records 117 comprises data corresponding to a calendar event that occurs, at least in part, within the time period represented by portion 311.

At step 1120, input data associated with the first portion is detected by touch input detector 220. In response, at step 1130, touchscreen enabled display device 115 is controlled to generate a representation of details of a first one of data records 117 in the subset in a second portion of the display device, different from the first portion. For example, details can be retrieved from a suitable first one of data records 117, for example date data, time data, and/or description data (e.g. text from the "Type" or "Notes" column of Table 1, and/or a corresponding field in a data record 117). Furthermore, in some embodiments, the second portion different from the first portion can comprise a portion of touchscreen enabled display device 115 corresponding to portion 313 of representation 300, or any other suitable portion: for example, in some embodiments, the second portion can comprise a portion of touchscreen enabled display device 115 corresponding to a floating text box within representation 300.

In embodiments that include representation 510, or the equivalent, and when representation 510 (or the equivalent) is not provided until a portion of touchscreen enabled display device 115 associated with a plurality of data records is selected, representation 510 can be provided at an optional step 1135.

At step 1140, an input event is detected within a portion of touchscreen enabled display device 115 associated with providing next data records. For example, input data can be detected at a portion of touchscreen enabled display device 115 associated with at least one of portion 311 (assuming portion 311 was selected at step 1120), portion 313 and representation 510, each of which in various embodiments, can be associated with providing next data records.

At step 1150, touchscreen enabled display device 115 is controlled to generate a representation of details of the next data record 117 in the subset, in a given order, in the second portion. Any suitable given order is within the scope of present embodiments, including but not limited to start times, end times, a type and a priority of calendar events associated with data records 117. In some embodiments, the given order can be a cyclic order, such that when a last data record in the given order is reached, a next data record can be the first data record in the given order.

At step 1160, it is determined if another portion of touchscreen enabled display device 115 has been selected, another portion corresponding to a portion of representation 300 other than portion 311, portion 313 and representation 510. If so, method 1100 ends at step 1170. Otherwise if another input event is detected within a portion of touchscreen enabled display device 115 associated with providing next data records, at step 1140, then step 1150 is repeated and the touchscreen enabled display device 115 is again controlled to generate a representation of details of yet the next data record 117 in the subset. If the touchscreen enabled display device 115 has been controlled to generate a representation of details of the last data record 117 in the subset, then, in some embodiments, touchscreen enabled display device 115 can be controlled to generate a representation of details of the first data record 117 in the subset, then the second for the next input event, etc., such that data records 117 are cycled through again.

Hence, each details of each data record 117 can be viewed using input data from touch input detector 220 only, and further without the use of another input device or a stylus, hence simplifying the complexity of mobile electronic device 101 and its overall cost. Furthermore, the amount of input data needed to view details of each data record 117 is reduced, in comparison to mobile electronic devices where details of data records can be viewed by bringing up different menu items and/or representation of a calendar application to access and view each data record individually.

Those skilled in the art will appreciate that in some embodiments, the functionality of mobile electronic device 101 can be implemented using pre-programmed hardware or firmware elements (e.g., application specific integrated circuits (ASICs), electrically erasable programmable read-only memories (EEPROMs), etc.), or other related components. In other embodiments, the functionality of mobile electronic device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for managing data records at a computing device, each of said data records representing different calendar data, said computing device comprising a processor interconnected with a memory enabled to maintain said data records, and with a touchscreen display device enabled to detect input data, said method comprising:
generating a representation of a subset of said data records within a first portion of said touchscreen display device, said first portion associated with said subset, said subset comprising at least two of said data records;
generating a representation of details of a first one of said data records in said subset in a second portion of said touchscreen display device, different from said first portion, when input data associated with said first portion is detected by said touchscreen display device; and
generating a representation of details of a next data record in said subset, in a given order, in said second portion, each time an input event is detected at a portion of said touchscreen display device associated with providing next data records.

2. The method of claim 1, wherein said given order comprises a cyclic order.

3. The method of claim 1, wherein said given order comprises an order according to at least one of respective start times associated with each data record, respective finish times associated with each data record, and respective priorities associated with each said data record.

4. The method of claim 1, wherein said portion of said touchscreen display device associated with providing next data records comprises at least one of said first portion and said second portion.

5. The method of claim 1, wherein said portion of said touchscreen display device associated with providing next data records comprises a third portion of said touchscreen display device.

6. The method of claim 5, further comprising controlling said touchscreen display device to generate a next data record icon in said third portion when input data associated with said first portion is first detected by said touchscreen display device.

7. The method of claim 1, wherein said representation of a subset of said data records is provided within a representation of a calendar application at said touchscreen display device.

8. The method of claim 7, wherein said first portion associated with said subset comprises a representation of a given time period within said calendar application, and a time period associated with each said data record in said subset comprises a portion of said given time period.

9. The method of claim 8, wherein said each said data record in said subset comprises at least one of calendar event data, meeting data, and alarm data.

10. The method of claim 1, wherein said touchscreen display device comprises at least one of a capacitive touchscreen display device, a resistive touchscreen display device, an infrared touchscreen display device, a surface acoustic wave touchscreen display device, an optical imaging touchscreen display device, a dispersive signal touchscreen and an acoustic pulse recognition touchscreen display device.

11. A computing device configured to manage data records, each of said data records representing different calendar data, said computing device comprising:
a memory enabled to maintain said data records;
a touchscreen display device enabled to detect input data;
a processor interconnected with said touchscreen display device and said memory, said processor enabled to control said touchscreen display device to:
generate a representation of a subset of said data records within a first portion of said touchscreen display device, said first portion associated with said subset, said subset comprising at least two of said data records;
generate a representation of details of a first one of said data records in said subset in a second portion of said touchscreen display device, different from said first portion, when input data associated with said first portion is detected by said touchscreen display device; and
generate a representation of details of a next data record in said subset, in a given order, in said second portion, each time an input event is detected at a portion of said touchscreen display device associated with providing next data records.

12. The computing device of claim 11, wherein said given order comprises a cyclic order.

13. The computing device of claim 11, wherein said given order comprises an order according to at least one of respective start times associated with each data record, respective finish times associated with each data record, and respective priorities associated with each said data record.

14. The computing device of claim 11, wherein said portion of said touchscreen display device associated with providing next data records comprises at least one of said first portion and said second portion.

15. The computing device of claim 11, wherein said portion of said touchscreen display device associated with providing next data records comprises a third portion of said touchscreen display device.

16. The computing device of claim 15, wherein said processor is further enabled to control said touchscreen display device to generate a next data record icon in said third portion when input data associated with said first portion is first detected by said touchscreen display device.

17. The computing device of claim 11, wherein said representation of a subset of said data records is provided within a representation of a calendar application at said touchscreen display device.

18. The computing device of claim 17, wherein said first portion associated with said subset comprises a representation of a given time period within said calendar application, and a time period associated with each said data record in said subset comprises a portion of said given time period.

19. The computing device of claim 18, wherein said each said data record in said subset comprises at least one of calendar event data, meeting data, and alarm data.

20. The computing device of claim 11, wherein said touchscreen display device comprises at least one of a capacitive touchscreen, a resistive touchscreen, an infrared touchscreen, a surface acoustic wave touchscreen, an optical imaging touchscreen, a dispersive signal touchscreen and an acoustic pulse recognition touchscreen.

21. A non-transitory computer-readable medium for storing program instructions for controlling a computing device configured to manage data records, each of said data records representing different calendar data, said program instructions for causing the computing device to:
generate a representation of a subset of said data records within a first portion of a touchscreen display device, said first portion associated with said subset, said subset comprising at least two of said data records;
generate a representation of details of a first one of said data records in said subset in a second portion of said touchscreen display device, different from said first portion, when input data associated with said first portion is detected by said touchscreen display device; and
generate a representation of details of a next data record in said subset, in a given order, in said second portion, each time an input event is detected at a portion of said touchscreen display device associated with providing next data records.

* * * * *